March 10, 1931.    J. W. WINTER    1,795,815
VALVE
Filed Jan. 18, 1929
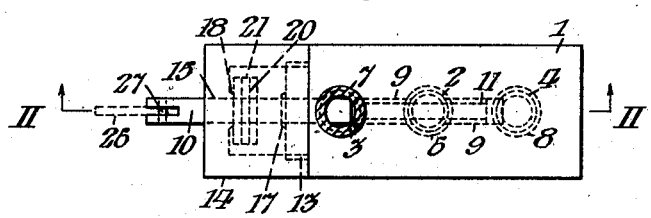
FIG. I.
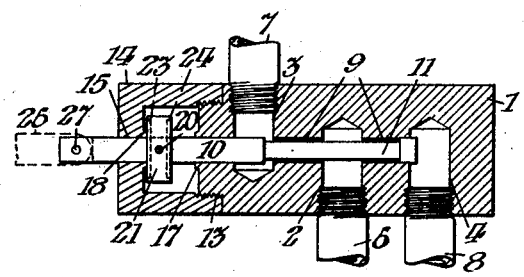
FIG. II.
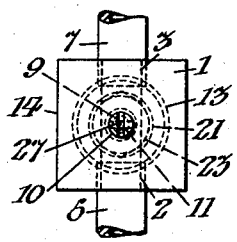
FIG. III.
Inventor:
Joseph William Winter, Patented Mar. 10, 1931

1,795,815

UNITED STATES PATENT OFFICE

JOSEPH WILLIAM WINTER, OF PENFIELD, PENNSYLVANIA, ASSIGNOR TO MASTER DOMESTIC REFRIGERATING COMPANY, INC., OF CONSHOHOCKEN, PENNSYLVANIA, A CORPORATION OF NEW YORK

VALVE

Application filed January 18, 1929. Serial No. 333,333.

This invention relates to valves of the slide plunger type adapted to alternately establish communication between a single inlet and two separate outlets. Ordinarily, the joint where the valve stem extends thru the casing is sealed, to prevent the escape of the fluid which the valve is intended to control, by means of a packing which is continually pressed in frictional engagement with the valve stem. Such construction and arrangement requires the expenditure of considerable energy to shift the valve thruout its range of movement.

As hereinafter described, the purpose and effect of the invention is to permit the axial movement of the valve from one extreme to the other, practically without friction, and to effect the sealing of the joint where the valve extends thru its casing to the outer atmosphere, by slight compression of a closure carried by the valve, and after it has reached its extreme position in either direction.

My improved valve is thus adapted for operation by the comparatively feeble energy of a thermostat, such as a sylphon bellows containing fluid which expands and contracts in accordance with changes in temperature. This invention was particularly designed for embodiment in a refrigerating system of the ammonia absorption type, including thermostatically operative controlling means of the character aforesaid and for controlling the supply of cooling water to the generator and condenser, in alteration. However, I do not desire to limit myself to such an embodiment or use of this invention.

My invention includes the various novel features of construction and arangement hereinafter more definitely specified.

In said drawings; Fig. I is a plan view of a valve embodying my invention.

Fig. II is a longitudinal sectional view, taken on the line II, II in Fig. I.

Fig. III is an elevation of the left hand end of said valve.

In said figures; the valve casing 1 is conveniently formed of a rectangular stock bar of bronze, or other suitable metal, having the screw threaded inlet port 2, intermediate of its length, and the screw threaded outlet ports 3 and 4 upon respectively opposite sides thereof. In the embodiment above contemplated, said inlet port 2 is in communication with the water supply pipe 6 and said outlet ports 3 and 4 are respectively connected by the pipes 7 and 8 with the cooling water containers of the condenser and generator. Communication is established between said ports thru the passage 9 which is a cylindrical drilled hole in which the axially movable plunger valve 10 is mounted to reciprocate. Said valve is conveniently formed of a stainless steel stock drill rod which is lapped in said passage so as to reciprocate freely therein, but in substantially water tight relation therewith at its full diameter. Said valve is reduced in diameter, conveniently by a turning operation, as indicated at 11, so that, in the extreme left position shown, the water supply thru the pipe 6 is delivered thru the passage 9 to the pipe 7; communication between said pipe 6 and the pipe 8 being prevented by the closure of the right hand end of said passage 9 by the full diameter of said valve 10, as shown in Fig. II.

The sliding joint between the valve and its casing, thus formed, permits only an extremely minute leakage thru the passage 9 in either direction when said passage is closed by the full diameter of the valve, and said leakage is negligible as between the several ports aforesaid. However, in order to prevent leakage around the valve where it extends to the outer atmosphere, I provide that end of said valve casing with the screw thread 13 for engagement with the screw cap 14 which has the bearing 15 drilled therethru in coaxial relation with said passage 9 and in which the valve 10 is also lapped so as to be practically fluid tight, altho free to slide axially without appreciable friction. I provide the end of said casing 1, projecting into said cap, with the annular seat 17 and provide the inner face of said cap with a similar annular seat 18, and fasten on said valve 10, conveniently by the cross pin 20, the internal stop collar 21 having recesses in its axially opposite faces in which leather washers 23 and 24 are carried. The effect of such construction is that when the valve is in the position shown in Fig. II, in which communication is established between the inlet port 2 and the outlet port 3 thru the passage 9 around the reduced portion 11 of said valve 10; the joint around the valve 10 in the cap 14 is sealed by slight compression of the leather 23 upon said seat 18. However, it is obvious that such sealing means does not oppose any frictional resistance to the movement of the valve to the right, to the opposite extreme of its movement, in which position communication between said ports 2 and 3 is shut off by the full diameter of the valve 10, and communication is established between said ports 2 and 4 thru said passage 9 around said reduced portion 11 of said valve. However, as said valve reaches its limit of movement in that direction, slight compression of the washer 24 against the seat 17 seals the joint between said valve 10 and the interior of said cap 14.

As indicated, the outside end of said valve 10 may be bifurcated to receive a link 26 which is pivotally connected therewith by the pin 27, to operatively connect said valve stem with the thermostatically actuated controlling mechanism above contemplated. However, said valve may be provided with any other suitable means to effect its axial reciprocation. Moreover, altho I find it convenient to make the reduced portion 11 of said valve 10 cylindrical, by a turning operation, it may be otherwise reduced, for instance, by flattening diametrically opposite faces of the cylindrical rod from which it is formed.

Therefore, I do not desire to limit myself to the precise details of construction and arrangement herein set forth, as it is obvious that various modifications may be made therein, without departing from the essential features of my invention, as defined in the appended claims.

I claim:

1. In a valve, the combination with a casing having a cylindrical passage extending longitudinally therein from one end thereof, and ports extending transversely in said casing from the exterior thereof into communication with said passage; said ports having screw threads at their outer ends for connection with pipes; of a valve, comprising a cylindrical plunger fitted to slide in said passage with portions of said valve fitted in substantially fluid tight relation with the wall of said passage; said valve having a reduced portion adapted to be positioned between adjoining ports to establish communication between such ports; a screw threaded cap detachably fitted upon one end of said casing, surrounding the end of said passage, and having a bearing for said valve extending thru said cap, in coaxial relation with said passage; annular valve seats surrounding said passage and said bearing, respectively on the end of said casing and on the inner face of said cap; a stop collar detachably rigidly connected with said valve between said seats, and having recesses in the axially opposite faces thereof; and washers of compressible resilient packing material in said recesses; whereby said valve is freely movable from one extreme of its movement to the other, but the joint surrounding the portion of said valve extending to the outer atmosphere is hermetically sealed at each extreme of its movement by slight compression of said stop collar toward the adjacent seat.

2. In a valve, the combination with a casing having a cylindrical passage extending longitudinally therein from one end thereof, and ports extending transversely in said casing from the exterior thereof into communication with said passage; said ports having means at their outer ends for connection with pipes; of a valve, comprising a cylindrical plunger fitted to slide in said passage with portions of said valve fitted in substantially fluid tight relation with the wall of said passage; said valve having a reduced portion adapted to be positioned between adjoining ports to establish communication between such ports; a cap detachably fitted upon one end of said casing, surrounding the end of said passage, and having a bearing for said valve extending thru said cap, in coaxial relation with said passage; annular valve seats surrounding said passage and said bearing, respectively on the end of said casing and on the inner face of said cap; a stop collar rigidly connected with said valve between said seats; and compressible resilient packing material upon axially opposite sides of said collar; whereby said valve is freely movable from one extreme of its movement to the other, but the joint surrounding the portion of said valve extending to the outer atmosphere is hermetically sealed at each extreme of its movement by slight compression of said stop collar toward the adjacent seat.

3. In a valve, the combination with a casing having a passage extending longitudinally therein from one end thereof, and ports extending transversely in said casing from the exterior thereof into communication with said passage; of a valve, comprising a plunger fitted to slide in said passage with portions of said valve fitted in substantially fluid tight relation with the wall of said passage; said valve having a portion adapted to be positioned between adjoining ports to establish communication between such ports; an annular seat surrounding said passage at the end of said casing, an internal stop collar rigidly connected with said valve opposite to said seat; means, on said casing, forming an inclosure for said stop collar and a seat for it at the outer extremity of its movement and compressible resilient packing material upon said collar opposite to said seats; whereby said valve is freely movable from one extreme of its movement to the other, and the joint surrounding the portion of said valve extending to the outer atmosphere is hermetically sealed at the outer extreme of its movement by slight compression of said stop collar toward the adjacent seat.

4. In a valve, the combination with a casing having a passage extending longitudinally therein from one end thereof, and ports extending transversely in said casing from the exterior thereof into communication with said passage; of a valve, fitted to slide in said passage with portions of said valve fitted in substantially fluid tight relation with the wall of said passage; said valve having a portion adapted to be positioned between adjoining ports to establish communication between such ports and a portion extending to the outer atmosphere; a single stop collar connected with said valve, adapted to cooperate with the casing to limit the movement of the valve in both directions; and packing material carried by said collar; whereby said valve is freely movable from one extreme of its movement to the other, and the joint surrounding the portion of said valve extending to the outer atmosphere is hermetically sealed when the axial movement of said valve, in either direction is stopped by said collar.

In testimony whereof, I have hereunto signed my name at Conshohocken, Pennsylvania, this seventh day of December, 1928.

JOSEPH WILLIAM WINTER.